United States Patent [19]

Takagi

[11] Patent Number: 4,985,620
[45] Date of Patent: Jan. 15, 1991

[54] IMAGE READING APPARATUS
[75] Inventor: Izumi Takagi, Kuwana, Japan
[73] Assignee: Brother Kogyo Kabushiki Kaisha, Nagoya, Japan
[21] Appl. No.: 458,316
[22] Filed: Dec. 28, 1989
[30] Foreign Application Priority Data
Dec. 28, 1988 [JP] Japan .................................. 63-33276
[51] Int. Cl.$^5$ ............................................. H01J 40/14
[52] U.S. Cl. ................................. 250/208.1; 358/483
[58] Field of Search ............... 250/208.1, 208.2, 208.3, 250/214 R, 214 C; 358/482, 483, 494

[56] References Cited
U.S. PATENT DOCUMENTS
4,680,644 7/1987 Shirato et al. ..................... 250/208.1

Primary Examiner—David C. Nelms
Attorney, Agent, or Firm—Kane, Dalsimer, Sullivan, Kurucz, Levy, Eisele and Richard

[57] ABSTRACT

In an image reading apparatus having a fluorescent lamp as a light source, the apparatus is so arranged that a so-called shading along a lengthwise direction of the fluorescent lamp and an effection caused by a change of a light amount of the fluorescent lamps are compensated simultaneously. Thus, in the image reading apparatus, it is possible to read an image of an original in a simple structure without being affected by the shading of the light source and a change of the light amount due to secular distortion. Thereby, the number of parts of the image reading apparatus becomes small and it can be produced at a low cost.

9 Claims, 4 Drawing Sheets

IMAGE READING APPARATUS

BACKGROUND OF THE INVENTION

The present invention relates to an image reading apparatus having a fluorescent lamp, more particularly to an image reading apparatus capable of controlling a quality of obtained output image so as to be improved in accordance with a change of an intensity of light radiated from the fluorescent lamp caused by a so-called secular change as well as a so-called shading along an extending direction of the fluorescent lamp.

Conventionally, as a light source for irradiating a desired original of an image reading apparatus, a fluorescent lamp has been widely used. However, a light amount radiated from a surface of the fluorescent lamp significantly depends on both a voltage being applied thereto and a temperature thereat. An image being read is affected by a change of the light amount thereof. Thereby, a density of the original cannot be precisely read, resulting in decreasing an image quality. To compensate the change of the light amount, a method in which the temperature on the surface of the lamp is controlled by means of a heater and a fan has been used. An another method in which the change of the light amount by the heat generation after the fluorescent lamp is turned on is measured in advance has been also used. At the time, the data relating to the light amount along the lengthwise direction are stored in a memory. The read data in accordance with image data are compensated by data being stored in the memory.

Further, as a compensation of the light amount in the lengthwise direction of the fluorescent lamp, i.e., shading compensation, another method in which the data relating to the light amount along the lengthwise direction has been stored in the memory and then the light amount is compensated in accordance with the data being stored.

However, to keep the temperature on the fluorescent lamp on a constant level during reading the image, it is necessary to provide a large scale head retaining unit or cooling unit for controlling the temperature of the surface of the fluorescent lamp so as to be kept in constant, thereby increasing a production cost and a size of the apparatus.

Moreover, the method in which the change of the light amount of the fluorescent lamp has been stored in the memory and then compensated is not proper from a view of a so-called secular change of the fluorescent lamp.

In addition, since it is necessary to provide a unit required for the shading compensation other than the unit required for the above operation, the structure of the apparatus becomes complicated.

SUMMARY OF THE INVENTION

It is therefore an object of the invention to provide an improved image reading apparatus having a function for compensating the shading and compensating the change of the light amount simultaneously.

For this purpose, according to the invention, there is provided an image reading apparatus comprising a light source member for radiating a light which shines a desired original, first convert means for converting the light reflected from the original into an analog signal along a predetermined direction in accordance with an intensity of the reflected light, and second convert means for converting the analog signal converted by said first convert means into a quantized digital signal, said image reading device further comprising:

third convert means for converting the radiated light into a first predetermined signal in accordance with an intensity of the light;

fourth convert means for converting the radiated light into a second predetermined signal along said predetermined direction in accordance with an intensity of the radiated light;

signal generating means for generating a third predetermined signal based upon said first and second predetermined signals; and control means for controlling the digital signal converted by said second convert means so as to be varied based upon said third predetermined signal generated by said signal generating means.

DESCRIPTION OF THE ACCOMPANYING DRAWINGS

DESCRIPTION OF THE EMBODIMENTS

Figure 1:
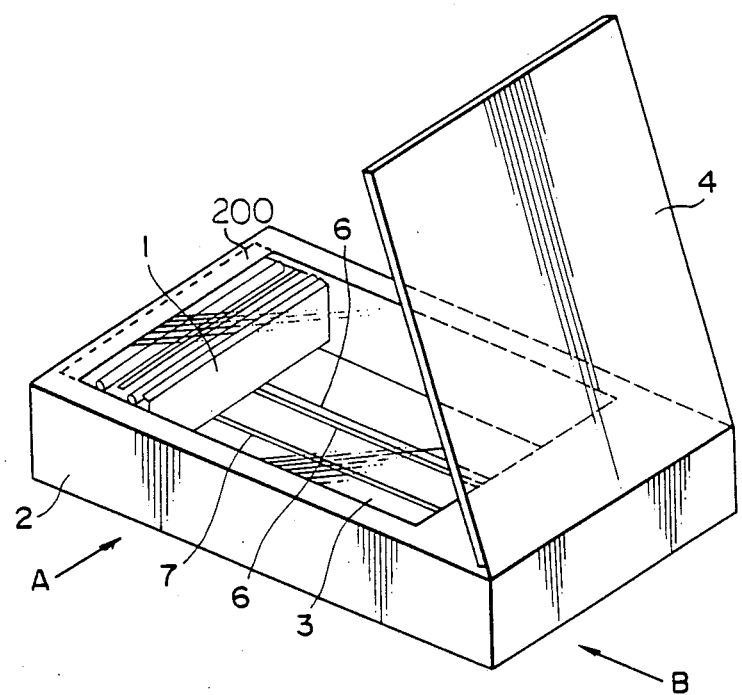
FIG. 1 is a perspective view showing a mechanical structure of an image reading apparatus according to the present invention.

By referring to the drawings, an embodiment of the present invention is described hereinafter.

By referring to FIG. 1 an optical system of one embodiment of an image reading apparatus according to the present invention is described. A main unit 2 is provided with an original supporter 4 which can be opened and closed at the top thereof. At the top of the main unit 2, a transparent original table 3 for placing a desired original 5 is disposed. In the main unit 2, the scanner unit section 1 as a movable reading section is supported by two guide shafts 6 and 7 which are fixed by the main unit 2, the scanner unit section 1 being axially slid by a drive system, not shown.

Figure 2:
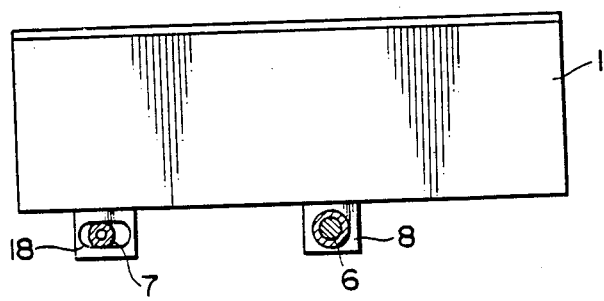
FIG. 2 is a sectional view of the image reading apparatus of FIG. 1 shown from a direction represented by an arrow B.
Figure 3:
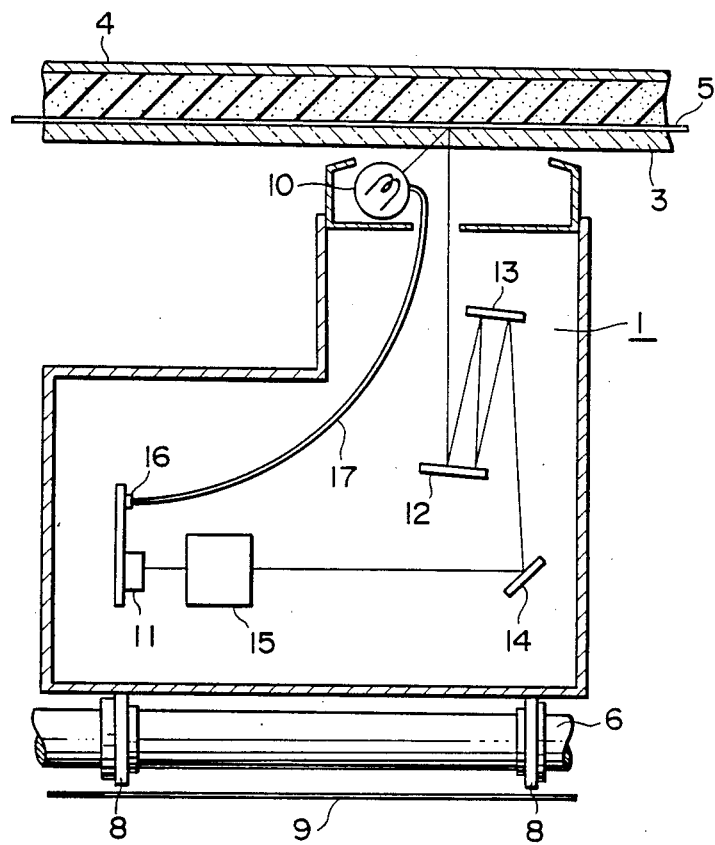
FIG. 3 is a sectional view of the image reading unit of FIG. 1 shown from a direction represented by an arrow A.

By referring to FIGS. 2 and 3, a structure of the scanner unit section 1 is described hereinafter. The guide shaft 6 is disposed downwardly adjacent to the center of gravity of the scanner unit section 1. The scanner unit section 1 is movably supported on the guide shaft 6 through a pair of tang pieces 8 provided on the lower surface thereof. Part of a wire rope 9 which transfers a force from the drive system is fixed to the tang pieces 8 so that the scanner unit section 1 is moved in a direction along which the guide shaft 6 is extended. The internal structure of the scanner unit section 1 is described hereinafter. A reading system provided in the scanner unit section 1 is composed of a light source 10 for irradiating a light to the original 5, a solid image pickup device 11, for example a CCD (Charge Coupled Device), for receiving a light corresponding to a one line of the original reflected by the original 5, three mirrors 12, 13, and 14 for respectively guiding the reflected light to the reading device 11, a lens 15, a photo diode 16, and an optical fiber 17 for guiding a part of the light from the light source 10 to the photo diode 16. Besides the guide shaft 6, the main unit 2 is provided with the guide shaft 7 through a tang piece 18 for subsidiarily guiding the scanner unit section 1 at the lower end of the scanner unit section 1.

Figure 4:
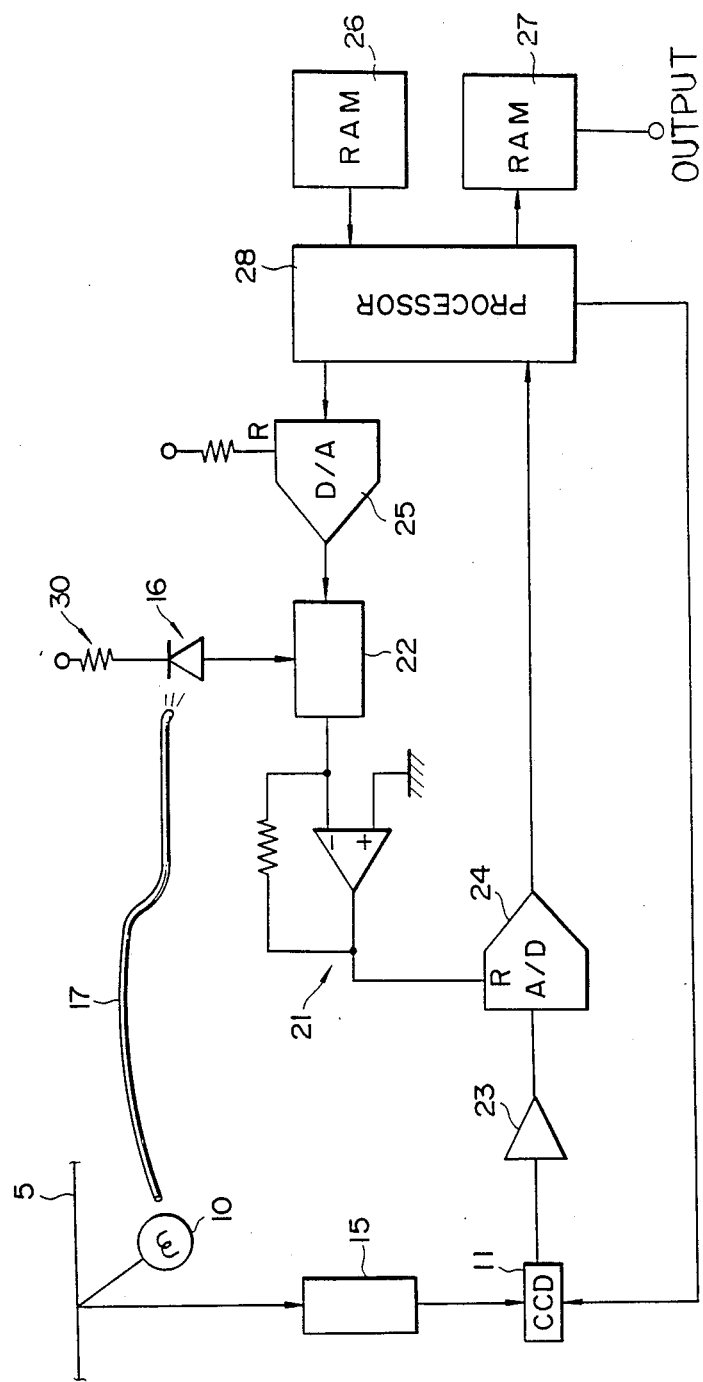
FIG. 4 is a block diagram showing one embodiment of an electric structure of the image reading apparatus of FIG. 1.

By referring to FIG. 4, an electrical structure of the apparatus is described hereinafter. The CCD 11 is provided with light input devices being aligned so that one line of the original in the same direction of the fluorescent lamp 10 can be read at a time. The CCD 11 is electrically connected to a processor 28. An image signal for the one line of the original 5 is synchronized with a synchronous signal which is outputted from the processor 28. To the CCD 11, an amplifier 23 is electrically connected as shown in FIG. 4. The amplifier 23 amplifies the image signal for a process that follows. To the amplifier 23, an analog/digital converter (A/D converter) 24 is electrically connected. To a reference voltage input terminal R of the A/D converter 24, a reference voltage described later is applied. The A/D converter 24 compares the reference voltage with the image signal which has been amplified, quantizes the image signal with a predetermined sampling frequency, and outputs digital image data signal from an output terminal. To the output terminal, the processor 28 is electrically connected.

To one terminal of the photo diode 16, a predetermined voltage is applied through a resistor 30. On the other hand, to other terminal of the photo diode 16, one input terminal of a current multiplier 22 is electrically connected. To the other input terminal of the current multiplier 22, the output terminal of a current output type digital/analog converter (D/A converter) 25 is electrically connected. To the input terminal of the D/C converter 25, the processor 28 is connected so that 8-bit digital data can be inputted from the processor 28. To the output terminal of the current multiplier 22, a current-voltage converter 21 including an operational amplifier is electrically connected. To the output terminal of the current-voltage converter 21, a reference voltage input terminal R of the A/D converter 24 is connected.

To the processor 28, a RAM (Random Access Memory) 26 and an another RAM 27, described below, are respectively connected.

An electrical operation of the apparatus is described hereinafter. The original 5 is placed so that a surface on which the image to be read is represented is in contact with the top of the original table 3 and the surface of the original 5 is equally contacted with the original table 3 by the original supporter 4. After that, when a original read signal is issued, the signal is sent to the drive system and the scanner unit section 1 is moved to a white reference plate reading position, described below, through the wire rope 9. At the time, the light reflected from the white reference plate 200 having been stuck on the upper rear side of the main unit 2 is received.

The CCD 11 outputs an image signal corresponding to one line of the white reference plate 200 during one signal period.

The image signal corresponding to the one line is amplified by the amplifier 23 and then input to the A/D converter 24.

The photo diode 16 receives the light from the fluorescent lamp 10 through an optical fiber 17 and sends a current corresponding to the received light amount to one input terminal of a current multiplier 22. The processor 28 outputs the numeric value 255 as digital data to the D/A converter 25. In other words, the numeric value 255 is designated as a value corresponding to the light reflected from the white reference plate. The D/A converter 25 outputs a current according to the digital data. The current flows to the other input terminal of the current multiplier 22. The current multiplier 22 outputs a current proportional to the current being input from these input terminals. This current signal is converted into a voltage value proportional to a current value by the current-voltage converter 21. This voltage is inputted to the A/D converter 24 as a reference voltage.

The A/D converter 24 compares the reference voltage with the image signal which is outputted from the amplifier 23 and quantizes the signal. The processor 28 computes the maximum value of the image signal being quantized and sets the integrated time of the CCD 11 so that the maximum value becomes "254". The image data for the one line where the image signal of the white reference plate which is integrated in the integrated time being set is stored in the RAM 26.

After that, the scanner unit section 1 is moved to the document reading start position. At the time, in accordance with the data being read from the white reference plate, the image of the document is read. When the one line of the image is completed, the scanner unit section 1 is moved to the next one line reading position. By repeating the above operation, the image of the original is read. An electric process for reading the original is described hereinafter.

The CCD 11 outputs signal corresponding to the original which is synchronized with the synchronous signal being outputted from the processor 28. The image signal is amplified by the amplifier 23 and then inputted into the A/D converter 24.

The processor 28 outputs the digital data according to the image data of the white reference plate which is stored in the RAM 26 to the D/A converter 25. This data is accordingly converted into a current by the D/A converter 25. This current value is multiplies by the current which flows in the photo diode 16 and then it is accordingly converted into a voltage by the current-voltage converter 21. The current which flows in the photo diode 16 is proportional to the light amount of the fluorescent lamp 10. In other words, the voltage which is outputted from the current-voltage converter 21 is proportional to the change of the light amount of the fluorescent lamp 10 and to the image data of the white reference plate 200 at the scanning position.

The A/D converter 24 inputs a voltage which is output from the current-voltage converter 21 as a reference voltage. The reference voltage is compared with the voltage of the signal being amplified by the amplifier 23 and the voltage of the signal is quantified. The data of the image signal being quantified is stored into the RAM 27 through the processor 28. In other words, the image signal of the A/D converter 24 is quantified by the ratio between the reflected light amount of the white reference plate 200 and the light amount of the fluorescent lamp and thereby data which is not affected by them is stored in the RAM 27.

By accessing the image data stored in the RAM 27, the image data of the document can be obtained.

In the image reading apparatus in the structure described above, when the light amount in a certain position where the original is placed is 80% of that at the peak position, the voltage level of the signal which is outputted from the CCD 11 while the certain position is being scanned becomes 80% of the ideal value (where there is no shading). However, in RAM 26, the image data "203" (i.e., =254×0.8) of the white reference plate 200 in the position is stored. Thereby, the processor 28 outputs the digital data "203" to the D/A converter 25 while the position is being scanned. On the other hand, while the peak position where the light amount becomes the peak value is being scanned, the processor 28 outputs the digital data "254". Thus, while the position A is being scanned, the output of the current-voltage converter 21 becomes 80% of the peak value of the light amount (an error of quantification is ignored). Therefore, the image signal being inputted into the A/D converter 25 becomes 80% of the ideal value. However, since the reference value becomes 80% likewise, it is quantified on the same level. Thereby, the image data stored in the RAM 27 are not affected by the shading.

When the light amount of the fluorescent lamp 10 on some line becomes 120% of that in the reading start position due to the secular change of the fluorescent lamp 10, the current which flows in the photo diode 16 also increases to 120%. Thereby, the reference voltage also increases for 120% likewise. As described above, even if the light amount of the fluorescent lamp 10 changes, because the reference voltage accordingly changes, the image is quantified on a constant level.

Figure 5:
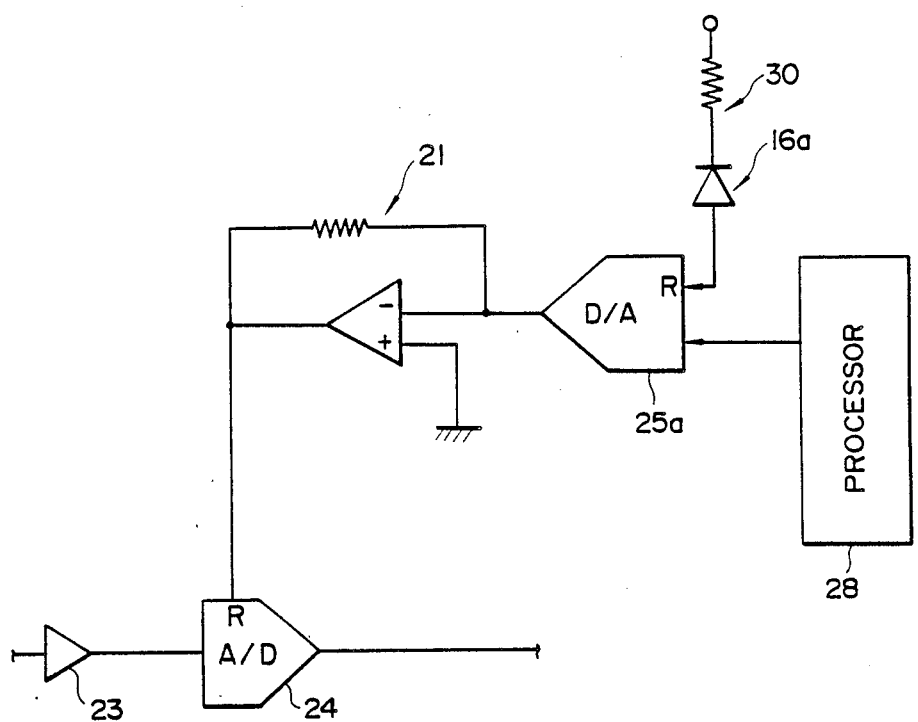
FIG. 5 is a block diagram showing an another embodiment of an electric structure of the image reading apparatus of FIG. 1.

When a photo diode 16a where a large amount of current flows is used, the same effect can be obtained in the structure shown in FIG. 5. In other words, when the current which flows in a D/A converter 25a as the reference current, the D/A converter 25a outputs a current proportional to a value where digital data being outputted from the processor 28 is multiplied by the current which flows in the photo diode 16a. Consequently, it is possible to provide the function of the current multiplier 22 in FIG. 4 to the D/A converter 25. The output current of the A/D converter 25 is inputted into the current-voltage converter 21. Other operations are same as those described above.

What is claimed is:

1. An image reading apparatus comprising a light source member for radiating a light which shines a desired original, first convert means for converting the light reflected from the original into an analog signal along a predetermined direction in accordance with an intensity of the reflected light, and second convert means for converting the analog signal converted by said first convert means into a quantized digital signal, said image reading device further comprising:
    third convert means for converting the radiated light into a first predetermined signal in accordance with an intensity of the light;
    fourth convert means for converting the radiated light into a second predetermined signal along said predetermined direction in accordance with an intensity of the radiated light;
    signal generating means for generating a third predetermined signal based upon said first and second predetermined signals; and
    control means for controlling the digital signal converted by said second convert means so as to be varied based upon said third predetermined signal generated by said signal generating means.

2. The image reading apparatus according to claim 1 wherein said first convert means comprises a CCD member including a plurality of light receiving elements which are arranged along said predetermined direction for outputting an analog signal corresponding to an intensity of the received light, and wherein said second convert means comprises an A/D converter member whose output signal is varied based upon said third predetermined signal generated by said signal generating means.

3. The image reading apparatus according to claim 2 wherein said third converting means comprises a photo diode member and said first predetermined signal is an electric current flowing through said photo diode member in accordance with an intensity of the radiated light, and wherein said fourth convert means comprises a whitened plate member extending along said predetermined direction for reflecting the radiated light and said second predetermined signal is an electric current corresponding to an intensity of the light reflected from said plate member.

4. The image reading apparatus according to claim 3 wherein said signal generating means comprises a current multiplier member and said third predetermined signal is an electric current proportional to both the electric current flowing through said photo diode member and the electric current corresponding to an intensity of the light reflected from said plate member, and wherein said control means comprises a current-voltage convert member for converting the electric current generated by said current multiplier member into an electric voltage to be supplied to said A/D converter member as a reference voltage thereof.

5. The image reading apparatus according to claim 3 which further comprises drive means for driving at least said light source member, said CCD member, and said whitened plate member to be moved perpendicularly to said predetermined direction.

6. The image reading apparatus according to claim 3 wherein said current-voltage convert member includes an operational amplifier member.

7. The image reading apparatus according to claim 1 wherein said light source member comprises a fluorescent lamp member extending along said predetermined direction.

8. The image reading apparatus according to claim 3 wherein said signal generating means comprises a D/A converter member for outputting an electric current proportional to both the electric current flowing through said photo diode member and the electric current corresponding to an intensity of the light reflected from said plate member, and wherein said control means comprises a current-voltage convert member for converting the electric current outputted from said D/A converter member into an electric voltage to be supplied to said A/D converter member as a reference voltage thereof.

9. A scanner unit adapted to be positioned in an image reading apparatus including a light source member for radiating a light which shines a desired original, a CCD member for converting the light reflected from the original into an analog signal along a predetermined direction in accordance with an intensity of the reflected light, and an A/D converter member for converting the signal converted by said CCD member into a quantized digital signal based upon the analog signal, said scanner unit comprising:
    a photo diode member for converting the radiated light into an electric current in accordance with an intensity of the light;

a whitened plate member extending along said predetermined direction for reflecting the light radiated from said light source member;

converter member for converting the radiated light from said whitened plate member into an electric current in accordance with an intensity of the reflected light;

current multiplier member for outputting an electric current proportional to both the electric current flowing through said photo diode member and the electric current converted by said convert means; and current-voltage convert means for converting the electric current outputted from said current multiplier member into an electric voltage to be supplied to said A/D converter member as a reference voltage thereof.

* * * * *